United States Patent
Koskinen et al.

(10) Patent No.: US 7,764,947 B2
(45) Date of Patent: Jul. 27, 2010

(54) ONLINE CHARGING MANAGEMENT SERVER

(75) Inventors: Juha-Pekka Koskinen, HML (FI); Anne Narhi, Tampere (FI)

(73) Assignee: Nokia Corporation, Espoo (FI)

( * ) Notice: Subject to any disclaimer, the term of this patent is extended or adjusted under 35 U.S.C. 154(b) by 776 days.

(21) Appl. No.: 11/293,155

(22) Filed: Dec. 5, 2005

(65) Prior Publication Data

US 2007/0041536 A1 Feb. 22, 2007

(30) Foreign Application Priority Data

Aug. 19, 2005 (GB) ................................ 0517065.9

(51) Int. Cl.
*H04M 11/00* (2006.01)
(52) U.S. Cl. ...................... 455/405; 455/406
(58) Field of Classification Search ......... 455/405–409; 705/1, 5, 30, 34, 40; 379/114.01–114.03, 379/114.28, 114.29, 115.03, 115.05, 127.03
See application file for complete search history.

(56) References Cited

U.S. PATENT DOCUMENTS

| | | | |
|---|---|---|---|
| 2003/0097561 A1* | 5/2003 | Wheeler et al. | 713/168 |
| 2004/0133486 A1* | 7/2004 | Markki et al. | 705/34 |
| 2004/0139012 A1* | 7/2004 | Koskinen et al. | 705/40 |
| 2004/0167834 A1* | 8/2004 | Koskinen et al. | 705/30 |
| 2005/0111641 A1* | 5/2005 | Koskinen et al. | 379/114.2 |
| 2006/0114913 A1* | 6/2006 | Cai et al. | 370/395.52 |
| 2007/0036312 A1* | 2/2007 | Cai et al. | 379/126 |

FOREIGN PATENT DOCUMENTS

WO WO 2005/027406 A1 3/2005

OTHER PUBLICATIONS

3GPP TS 32.240; "Universal Mobile Telecommunications System (UTMS)" (XP14030706); V6.2.0 pp. 12-37; Jun. 2005.
3GPP 132 296; "Digital Cellular Telecommunications System (Phase 2+)" (XP014028039); V6.0.0 pp. 14-32; Dec. 2004.
3GPP TS 32.299, "Universal Mobile Telecommunication System (UMTS) Telecommunication Management": V6.3.0 pp. 9-31; Jun. 2005.
International Search Report, PCT/IB2006/002152, filed Jul. 24, 2006.
3GPP TR32.815 v. 6.1.0, $3^{rd}$ Generation Partnership Project; Technical Specification Group Services and System Aspects; Telecommunication Management; Charging Management; Online Charging System (OCS) Architecture Study (Release 6), Jun. 2005, 21 pages.

* cited by examiner

*Primary Examiner*—Kamran Afshar
(74) *Attorney, Agent, or Firm*—Alston & Bird LLP

(57) ABSTRACT

An online charging management server comprising: receiving means arranged to receive at least one account request message transmitted from a network service provider; and transmitting means arranged to transmit an online account balance message to a further separate server based on the received account request.

23 Claims, 8 Drawing Sheets

ONLINE CHARGING MANAGEMENT SERVER

BACKGROUND OF THE INVENTION

1. Field of the Invention

The present invention relates to an online charging server, and more particularly but not exclusively to an online charging server for the provision of prepay functions for wireless cellular networks.

2. Description of the Related Art

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by a fixed line and/or wireless communication interfaces. A feature of wireless communication systems is that they provide mobility for the users thereof. An example of communication systems providing wireless communication is a public land mobile network (PLMN). An example of the fixed line system is a public switched telephone network (PSTN).

A communication system typically operates in accordance with a given standard or specification which sets out what the various elements of a system are permitted to do and how that should be achieved. For example, the standard or specification may define if the user, or more precisely user equipment, is provided with a circuit switched server or a packet switched server or both. Communication protocols and/or parameters which should be used for the connection are also typically defined. For example, the manner how communication shall be implemented between the user equipment and the elements of the communication networks is typically based on a predefined communication protocol. In other words, a specific set of "rules" on which the communication can be based needs to be defined to enable the user equipment to communicate via the communication system.

The introduction of Third Generation (3G) communication systems will significantly increase the possibilities for accessing services on the Internet via mobile user equipment (UE) as well as other types of UE.

Various user equipment (UE) such as computers (fixed or portable), mobile telephones, personal data assistants or organizers and so on are known to the skilled person and can be used to access the Internet to obtain services. Mobile user equipment referred to as a mobile station (MS) can be defined as a means that is capable of communication via a wireless interface with another device such as a base station of a mobile telecommunication network or any other station.

The term "service" used above and hereinafter will be understood to broadly cover any service or goods which a user may desire, require or be provided with. The term also will be understood to cover the provision of complimentary services. In particular, but not exclusively, the term "service" will be understood to include Internet protocol multimedia IM services, conferencing, telephony, gaming, rich call, presence, e-commerce and messaging e.g. instant messaging. A "service" may comprise two or more parts. For example, a video telephone service comprises a voice part and a video part. Alternatively two or more services may be provided at the same time, for example a gaming service and a chat room service may be provided at the same time.

The 3G Partnership Project (3GPP) is defining a reference architecture for the Universal Mobile Telecommunication System (UMTS) core network which will provide the users of user equipment UE with access to these services. This UMTS core network is divided into three principal domains. These are the Circuit Switched domain, the Packet Switched domain and the Internet Protocol Multimedia (IM) domain.

The latter of these, the IM domain, makes sure that multimedia services are adequately managed. The IM domain supports the Session Initiation Protocol (SIP) as developed by the Internet Engineering Task Force (IETF).

One aspect of management relevant for both IMS and non IMS systems (i.e. services provided to subscribers via service nodes outside the core network, e.g. multimedia messaging and location estimation services), is that of charging users for supply of services. Charging can be divided into two modes of charging. The first is on-line charging which is where the user effectively pre-pays for a service and the second is off-line charging where a user is billed for a service after the session. Thus the first charging method is implemented by pay-as-you-go systems whereas the second method is implemented where the user is billed at regular intervals for calls which the user has made.

Currently for on line charging any network function wishing to charge a user is required to pass a Credit Control Request message to a network element known in the art as an Online Charging System (OCS). Attempts to standardise the OCS architecture has been defined in standards such at the third generation partnership project (3GPP) technical specification (TR) 32.815. Furthermore the applications and some interfaces operated by the OCS have furthermore been standardised by 3GPP TS 32.296.

The architecture of the OCS as currently implemented within these standards has problems for any operator attempting to operate a unified (i.e. online and off line) billing system. As defined by the above standards the OCS contains an account database which is operated on by an account balance management system. The account balance management system and account database within the OCS is effectively a partial duplication of information held by the operator for the off line accounting system.

SUMMARY OF THE INVENTION

It is an aim of the invention, and embodiments thereof, to provide an improvement to online accounting systems which offer the possibility of creating centralised accounting operating such systems.

There is provided according to the invention an online charging management server comprising: receiving means arranged to receive at least one account request message transmitted from a network service provider; and transmitting means arranged to transmit an online account balance message to a further separate server based on the received account request.

The online account balance message may be an online account balance request message.

The online account balance request message may comprise a request for at least one of: Make a reservation; Commit reservation and make new reservation; Commit reservation; Release reservation; Balance query; Increase balance; and Decrease balance.

The receiving means may be further arranged to receive an online account balance message from the further server.

The online account balance message from the further server may be an online account balance answer message.

The online account balance answer message may comprise a value based on the online account balance request message.

The online account balance message may be a Diameter message.

The online account balance message may be a Diameter credit control message.

The server may be a rating server.

According to a second aspect of the present invention there is provided an online charging account management server comprising: receiving means arranged to receive an online account balance message from at least one further separate server, the online account balance message based on a received account request message transmitted from a network service provider; and processing means arranged to perform an online account balance action based on the received online account balance message.

The server may further comprise transmitting means arranged to transmit an online account balance message to the further server.

The online account balance message may be an online account balance request message.

The online account balance request message may comprise a request for at least one of: Make a reservation; Commit reservation and make new reservation; Commit reservation; Release reservation; Balance query; Increase balance; and Decrease balance.

The online account balance message transmitted to the further server may be an online account balance answer message.

The online account balance answer message may comprise a value determined by the processing means based on the performed action.

A system may comprise: the online charging management server as described above; and the separate online charging account management server as described above.

There is provided according to a third aspect of the present invention a method for performing online charging within a communications network comprising an online charging management server and a separate online charging account management server, the method comprising the steps of: receiving at the online charging management server at least one account request message transmitted from a network service provider; and transmitting from the online charging management server to the separate online charging account management server an online account balance message based on the received account request message.

The method may further comprise the steps of: receiving at the separate online charging account management server the online account balance message; and performing at the separate online charging account management server at least one account management function based on the received online account balance message.

The method may further comprise the step of transmitting from the separate online charging account management server to the online charging management server an online account balance message on the basis of the step of performing the at least one account management function.

According to a fourth aspect of the present invention there is provided a computer program product arranged to carry out the method for performing online charging within a communications network comprising an online charging management server and a separate online charging account management server, the method comprising the steps of: receiving at the online charging management server at least one account request message transmitted from a network service provider; and transmitting from the online charging management to the separate online charging account management server an online account balance message based on the received account request message.

The computer program product may further carry out the steps of: receiving at the separate online charging account management server the online account balance message; and performing at the separate online charging account management server at least one account management function based on the received online account balance message.

The computer program product may further carry out the step of transmitting from the separate online charging account management server to the online charging management server an online account balance message on the basis of the step of performing the at least one account management function.

According to a fifth aspect of the present invention there is provided a combined online and offline charging server comprising: an online charging account management server comprising: receiving means arranged to receive an online account balance message from at least one further separate server, the online account balance message based on a received account request message transmitted from a network service provider; and processing means arranged to perform an online account balance action based on the received online account balance message; and an offline charging account management server.

BRIEF DESCRIPTION OF THE FIGURES

The invention is described by way of example only with reference to the accompanying figures in which.

DESCRIPTION OF THE PREFERRED EMBODIMENTS

The invention is described herein by way of example with reference to a number of embodiments.

Figure 1:
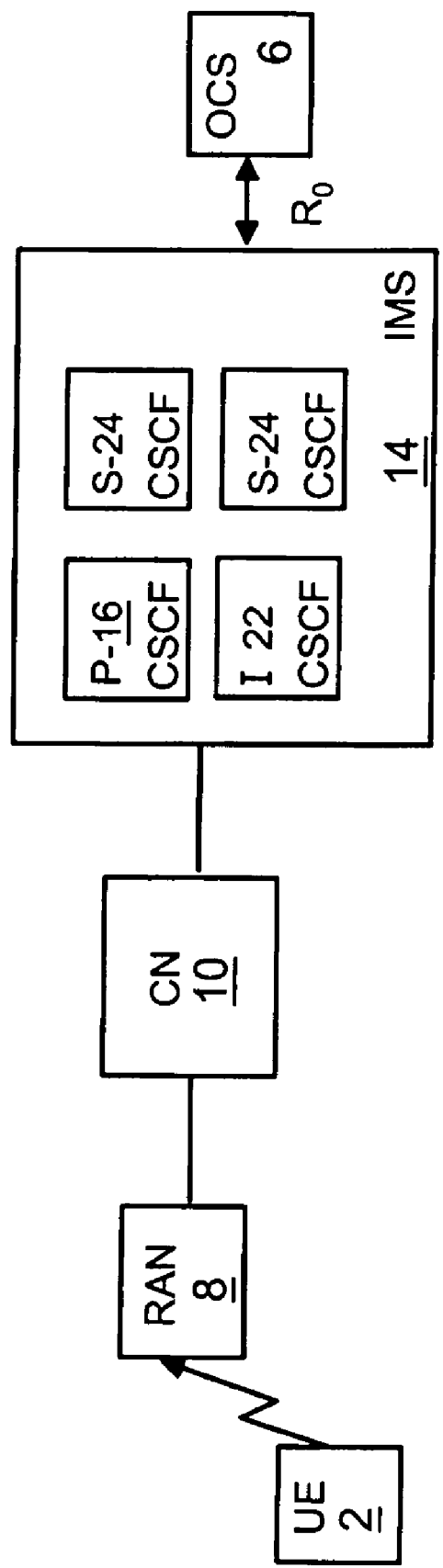
FIG. 1 shows a simplified view of a communications network containing a conventional online charging system.

Reference is made to FIG. 1 which shows schematically a system in which embodiments of the invention can be implemented. The system comprises user equipment 2. The user equipment 2 can take any suitable form and may for example be a mobile or fixed entity such as a mobile telephone, personal digital assistant (PDA), portable computer, laptop computer, fixed computer or any other suitable device. The user equipment 2 is arranged to communication with a radio access network (RAN) 8 via a wireless connection. This wireless connection may be at any suitable frequency, such as for example a radio frequency.

The radio access network 8 generally consists of a base station entity (sometimes referred to as node B). For the purpose of this document, the term base station will be used and is intended to cover any suitable entity. The radio access network 8 also comprises a control element. Depending on the standard, the control element can be referred to as a radio network controller (RNC) in the case of a UMTS system or a base station controller (BSC) in the case of a GSM system. It is intended that the term controller cover any such control entity. In some arrangements, the control function is provided separately from the base station function and a single control entity may control a number of base stations. In other embodiments of the present invention, each base station may incorporate part of the control function.

The radio access network is arranged to communicate with a core network 10. The core network 10 illustrated in FIG. 1 is a packet switched core network. The core network comprises at least one serving GPRS (general packet radio service) support node SGSN which is used to switch the packet switched transactions and at least one GPRS support nodes GGSN which are switches at the point where the core network 10 is connected to external packet switched networks.

The core network is connected to an IM (IP multi-media) subsystem 14. A GGSN is connected to a P-CSCF 16 (proxy call session control function) in the IMS 14. The P-CSCF is connected to a serving S-CSCF 24. The S-CSCF contacts an interrogating I-CSCF 22 in the terminated network. The I-CSCF 22 is arranged to determine the appropriate serving-CSCF (S) 24 for the end user that is the called party.

FIG. 1 shows a calling party. The called party may be connected to a different or the same IMS. Likewise, the called party may be connected to the same or a different OCS. Where the called party is connected to a different IMS, a different core network and RAN are provided. Where the IMS is the same, different core networks may or may not be required. Likewise, the RAN may be the same or different for the called party to that of the calling party.

Although for the purpose of simplifying the explanation of the invention in the above example the IMS 14 is shown connecting to the OCS 6 it would be understood by the person skilled in the art that the OCS 6 is also capable to operating with other non IMS network elements. Specifically 3 GPP specifies three types of protocol messages capable of communicating messages to the OCS 6. The first type of message, shown in FIG. 1, is the IMS online charging reference point defined in the 3 GPP specifications by the $R_0$ interface. The second type of message, not shown in FIG. 1, is for on-line charging reference points for non IMS services such as from Multimedia messaging services, WLANs, and Gateway GPRS serving nodes (GGSNs) which are defined within the 3 GPP specifications as the $R_0$ interface. The third type of message, also not shown in FIG. 1 but specified in the 3 GPP specifications are the Customised Application for Mobile network Enhanced Logic (CAMEL) Application Part (CAP) message which can be transmitted from network elements such as the Mobile Switching Centre (MSC) and Serving GPRS serving node (SGSN).

Figure 2:
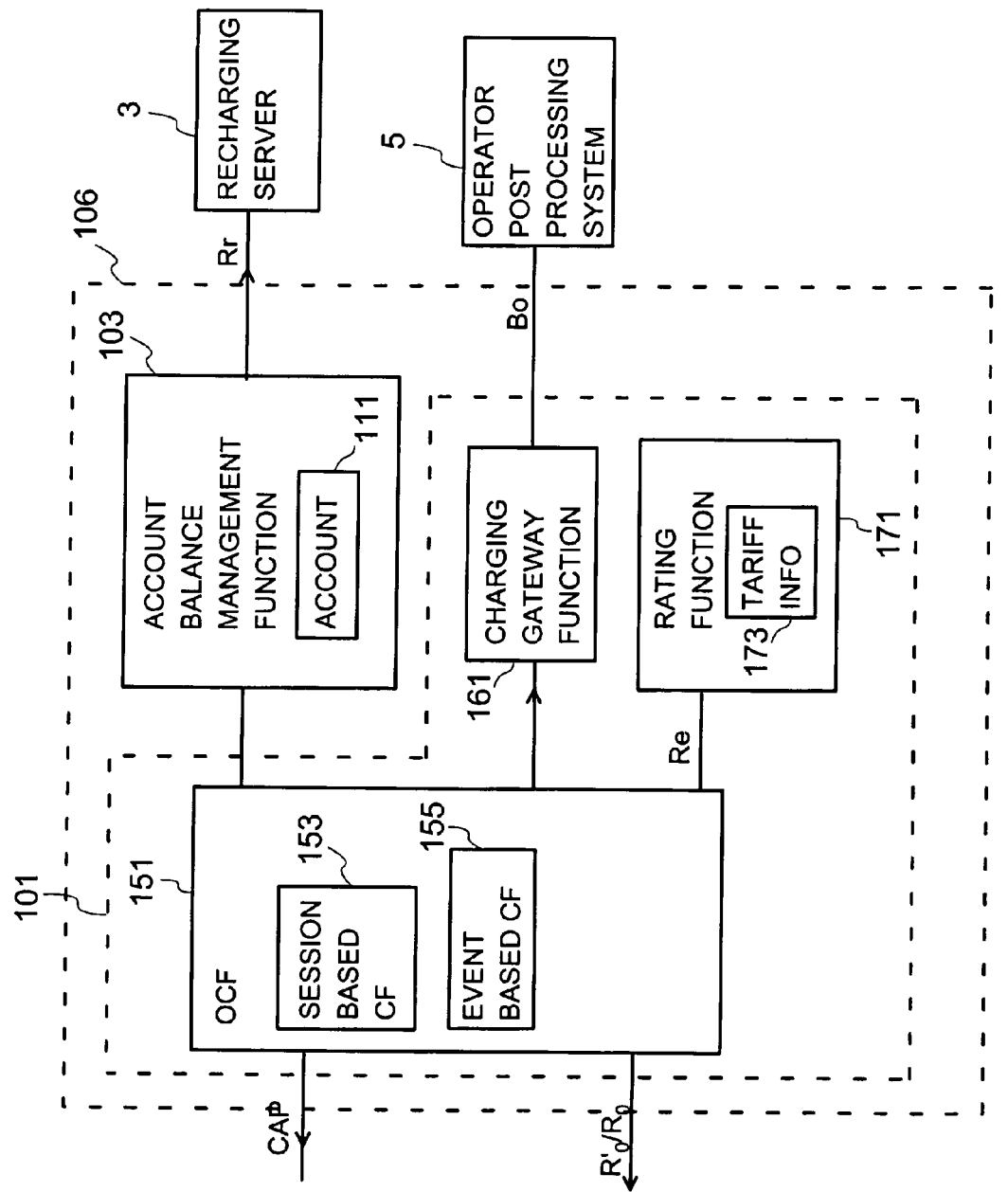
FIG. 2 shows a simplified view of an improved online charging system in which the invention and embodiments thereof may be implemented.

With reference to FIG. 2 an improved OCS 106 is shown. The improved OCS 106 comprises at least two physically separate servers. The first server is an account balance management server 103 and the second server is the charging and rating server 101.

The account management server, also known as an account balance management server 103 comprises an account balance management function arranged to transmit and receive messages to and from the charging and rating part. Furthermore the account balance server 103 comprises account data 111 capable of being accessed by the account balance management function.

The account balance server is further arranged to be connected to a recharging server 3. The recharging server is used to recharge the account values stored by the account data 111. Thus for example when a user account is low in terms of credit, where credit is for example currency, bandwidth air time, or data transmission availability, the recharging server can pass a message to the account balance management server 103 to 'top up' the account in question.

The charging and rating server, also known as an online charging management server, comprises an online charging function (OCF) 151, a charging gateway function 161, and a rating function 171. The OCF itself comprises a session based charging function 153 which as known in the art is used to perform IMS session charging on the receipt of an credit control messages from a IMS Call session control function (CSCF), and a event based charging function 155 which performs event based charging using the $R_0$ or $R_0'$ interface credit control messages. Although not shown in FIG. 2, the OCF 151 can in further embodiments comprise a bearer based charging function. The bearer based charging function is arranged to perform bearer based charging using the CAP protocol message type.

The charging gateway function 161 which is connected to the OCF 151 and the operator's post processing system 5, is used by the OCF 151 to gather and transmit charging information to the operator post processing system 5.

The rating function 171 is connected to the OCF 151 and is used by the OCF 151 to derive tariffs and rates of the available services. The functionality of the rating function 171 is well defined in 3GPP TR 32.815 as being one of unit determination, calculation and reservation of a number of session related non-monetary units (service units, data volume, time and events), price determination (calculation of monetary units for a given number of non-monetary units, tariff determination (determination of tariff information based on the subscribers contractual terms and service being requested), and get/set counters applicable for rating.

With regards to the interaction of the account balance management server 103 and the charging and rating server 101, a pair of account balance request (ABR) and account balance answer (ABA) messages are disclosed hereafter.

A template for an ABR message is shown below

ABR:

<Session-Id>
{-Normal routing based information as in Diameter base-}
{ Account-Balance-Action}
{ Account-Balance-Request-Number}
{ User-Name/Account-Id}
[ Requested-Service-Unit]
[ Used-Service-Unit]

where the field <session-Id> is a unique session number provided by the OCF 151, the field {Account-Balance-Action} represents the action requested from the account balance management server 103. The field {Account-Balance-Request-Number} is a number identifying this specific request from the charging and rating server 101 to the account balance management server 103. The field {User-Name/Account-Id} is the identifier linking the user requesting the service to the account code stored within the account balance management server 103. The field [Requested-Service-Unit] identifies the service providing network element from which the user has requested a service. The field [Used-Service-Unit] identifies any service providing network element which has already provided the user with a service.

and a template for an ARA message is shown below.

ABA:

<Session-Id>
{-Normal routing based information as in Diameter base-}
{ Account-Balance-Action}
{ Account-Balance-Request-Number}
{ User-Name/Account-Id}
[ Granted-Service-Unit]

the only additional field being that of the [Granted-Service-Unit] which is the identifier identifying a value which has been determined by the account balance management server 103 based on the action carried out by account balance management server.

Furthermore the Account-Balance-Action AVP field has the following values:
1 Make reservation
2 Commit reservation and make new reservation
3 Commit reservation
4 Release reservation
5 Balance query
6 Increase balance
7 Decrease balance In separating the online charging server into online charging management and online charging account balance management servers which communicate by means of the above described messages then it is possible to incorporate the functionality of the online charging account balance management server into a combined online and offline account balance management server and therefore overcome the problems of account and data duplication between users with online and offline accounts.

The operation of the account and balance management server 103 on receipt of these values will be further disclosed with respect to FIGS. 3 to 9 below. The examples described with respect with these figures comprise the simplified network architecture of the user equipment 2, a network element 51 (which in the example provided by FIG. 1 would be within the IMS 14 but equally can be any of the network elements described earlier), the OCF 151 and the account balance management server 111.

Figure 3:
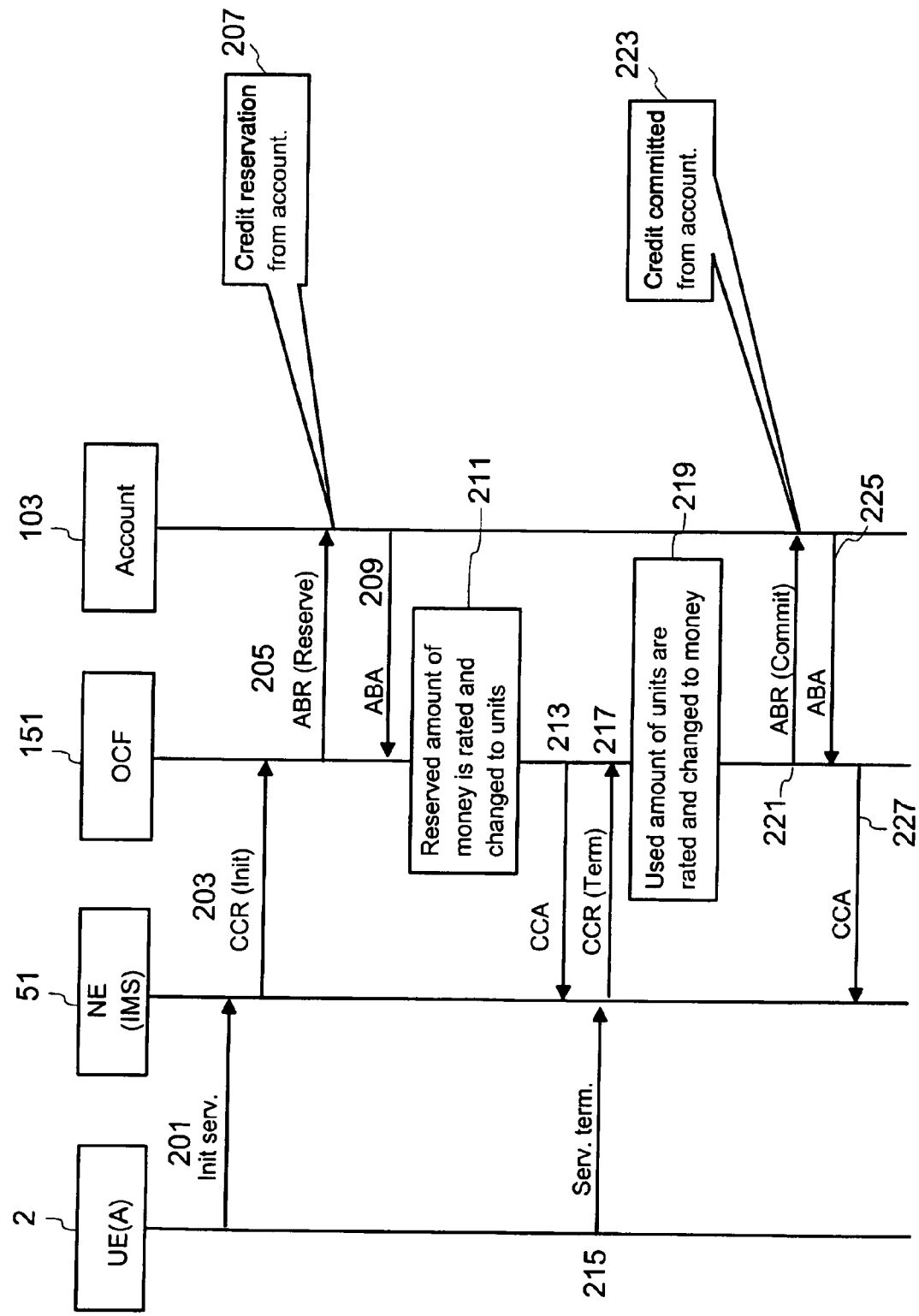
FIG. 3 to 8 show flow diagrams demonstrating the operation of the improved online charging system for a range of accounting operations.

With respect to FIG. 3, a first example of the use of these account balance request (ABR) and account balance answer (ABA) messages is shown for a standard service operation and termination. The first step 201 occurs when the UE 2 transmits an initial service request to the network element 51.

The next step 203 occurs when the network element 51 transmits a credit control request initialisation message to the OCF 151. The credit control message initialisation message is sent in order to determine if the user has sufficient credit for the service requested and to request on-line payment.

In the next step 205 the OCF 151 transmits an ABR Reserve message (i.e. an ABR message with an Account-Balance-Action AVP field set to 1) to the account balance management server (ABMS) 103.

On receipt of this message the ABMS 103, in the next step 207, examines the account information and if there is sufficient credit within the account makes a credit reservation in the account. A credit reservation effectively ring fences a predetermined amount of credit from being used until the reservation is removed. As described previously this credit can be monetary in nature, or can be network dependent, e.g. bandwidth, data, event count related. In the following examples described hereafter the credit is monetary in nature.

After making this credit reservation, the ABMS 103 transmits in step 209 an ABA message back to the OCF 151 acknowledging that the reservation was successful.

The OCF 151 then calculates (using the rating function not shown in FIG. 3), the number of units which relate to the service which the user can obtain using the reserved monetary value. Thus for example if the service is on demand video measurable in terms of kB of data received and rated at F euros per kB received, with the reserved monetary value being G euros per reservation then the OCF calculates that each reservation is able to provide G/F kB of video before the reservation is exhausted.

The OCF then transmits, in step 213, to the NE 51 a credit control answer message containing a value of the number of units available to the user for the supply of this service. Once the NE 51 receives this message the NE then starts to supply the service to the UE 2.

If the user operating the UE 2 wishes to end the service before all of the allocated units are exhausted the steps 215 to 227 describe the process used in the present invention to account for the remaining unit value.

Step 215 occurs when the UE 2 transmits to the NE 51 a service termination request. The NE 51 after receiving the termination request calculates the remaining units and in step 217 transmits to the OCF 151 a CCR termination message, the message contains the remaining unit value.

The OCF 151 on receiving the remaining unit value, calculates in step 219 the reverse calculation of step 211 to determine remaining credit value is, which for the above examples is a euro currency value.

The OCF 151 then transmits to the ABMS 103 an ABR Commit message, (i.e. an ABR message with an Account-Balance-Action AVP field set to 3). Within the message the currency remaining value from the reserved amount is also passed.

The ABMS 103 then in step 223 examines the credit reservation and returns to the active account value the remaining value, effectively refunding the partially unused reserved currency.

In the following step 225 the ABMS 103 transmits to the OCF 1512 an ABA message informing the OCF 151 that the commit procedure succeeded.

In a further step 227 the OCF 151 transmits to the NE a further CCA message confirming at the NE 51 that the commit charge has been credited.

Figure 4:
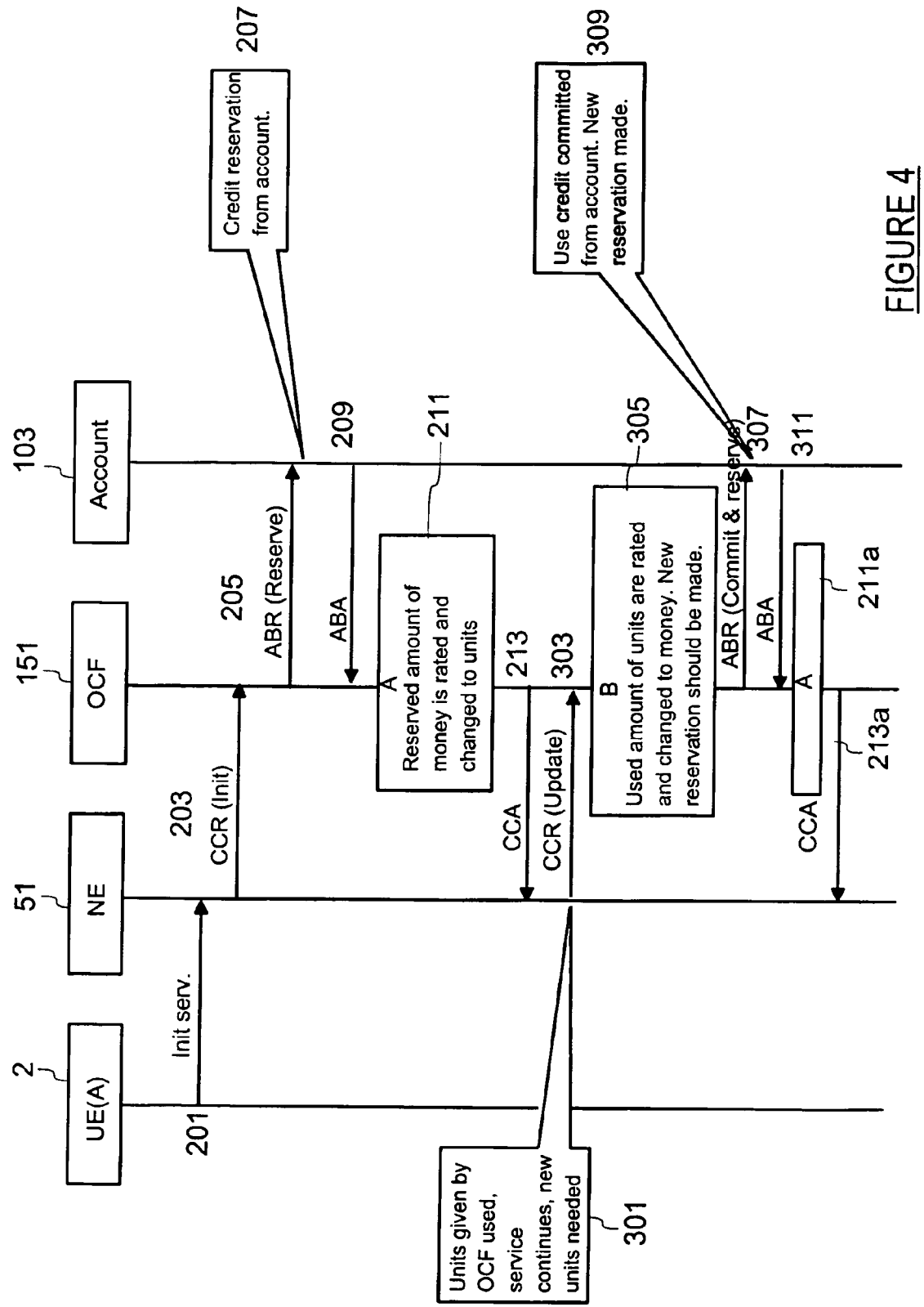

With respect to FIG. 4, a second example of the present invention is described where the units supplied by the OCF 151 are exhausted before the service is terminated.

The first six steps 201 to 213 of the second example follow the same procedure as that described in the first six steps of the previous example describing the initialisation of the service.

When the reserved and converted units have been exhausted whilst the service is continued then in step 301 the NE 51 determines that new units are required to continue the operation of the service.

In the next step 303, the NE 51 transmits to the OCF 151 a CCR update message.

The OCF 151 on receiving the CCR update message performs a rating and conversion operation to convert the used units into the monetary equivalent. This step 305 is a similar operation to that performed by step 219 of the first example, the only difference being that the value returned is equal to the amount originally reserved.

The OCF 151 in the step following the calculation transmits to the ABMS 103 an ABR commit and reserve message (i.e. an ABR message with an Account-Balance-Action AVP field set to 2).

The ABMS 103 on receipt of the ABR commit and reserve message then performs in step 309 the actions of committing the used credit from the reserved account and a creation of a further reservation.

In the next step the ABMS 103 transmits to the OCF 151 an ABA message containing the value of the reserved amount.

In the following two steps 211a, and 213a the OCF 151 performs a conversion of credits to units operation similar to that carried out in step 211 followed by the transmission of a CCA message to the NE 51. The CCA message received at the NE 51 is similar to the message sent in step 213 where the message contained the determined number of units. The service at the end of this procedure can now be continued until it is terminated by the user as described in the first example as shown in FIG. 3 steps 215 onwards, or the further units are exhausted and the NE requests a further update with a repetition of steps 303 onwards.

Figure 5:
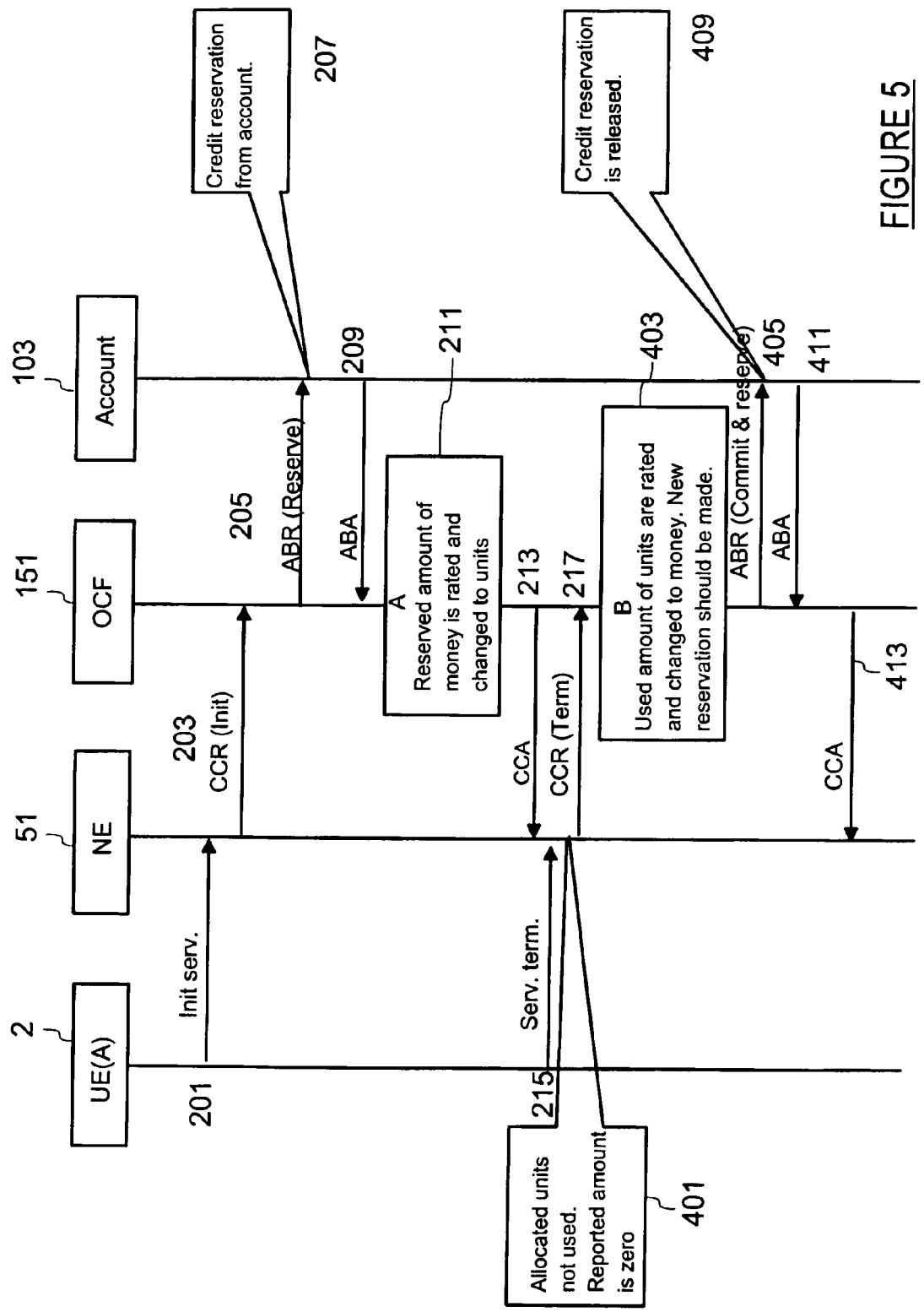

With respect to FIG. 5 a further example of the present invention is demonstrated whereby the user initially requests a service but does not actually use any of the units transferred to the NE 51.

The first six steps 201 to 213 of the third example are the same as the first six steps 201 to 213 of the first and second examples showing the initialisation of the service.

In the next step 215 the UE 2 transmits to the NE 51 a service termination request. In step 401 the NE 51 determines that the service did not use any units. As described above with respect to the previous service termination sequence and referenced by the step 217, the NE 51 transmits to the OCF 151 a CCR termination message.

The OCF 151 on receiving a CCR termination message calculates in step 403, the amount of monetary credits used. This step is similar to steps 219 and 305 of the previous examples except in this example there are zero used units and therefore the amount of monetary credits used is therefore also zero.

The OCF 151, on detecting that zero units were used transmits, in step 405, an ABR release message (i.e. an ABR message with an Account-Balance-Action AVP field set to 4) to the ABMS 103.

The ABMS 103 in step 409, having received the ABR release message releases the reservation. This in effect returns the credit that had been ring fenced in step 207 to the active account.

The ABMS 103 then in step 411 transmits to the OCF 151 an ABA message acknowledging that the reservation release was successful.

The OCF 151 then in step 413 transmits to the NE 51 a CCA message informing the NE that the termination accounting process was successful.

Figure 6:
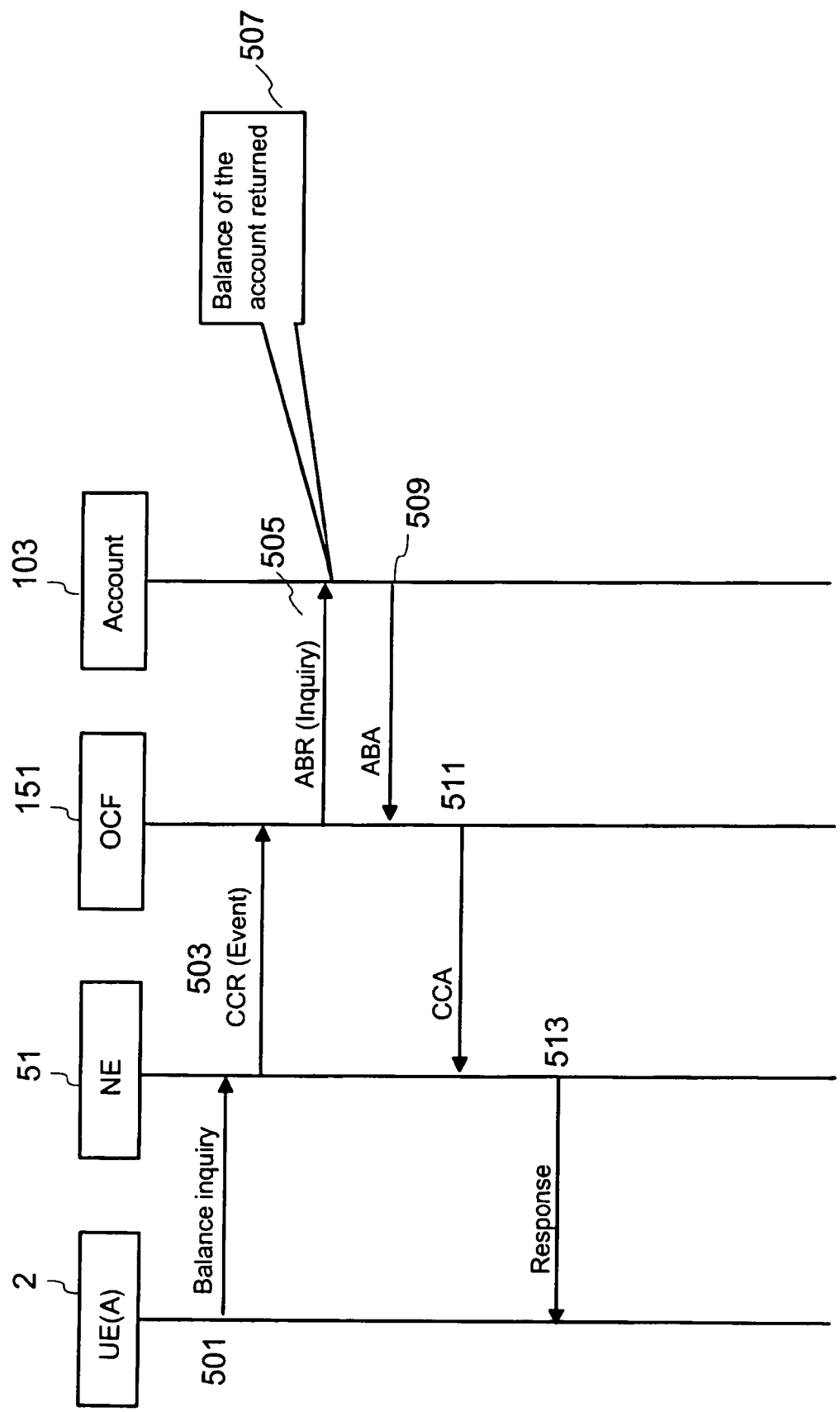

With respect to FIG. 6, a further example of the present invention is shown where the user operating the UE 2 wishes to see the value of the users current account balance.

In step 501 the UE 2 transmits to the NE 51 a balance inquiry message.

In step 503 the NE 51 on receipt of the balance inquiry request transmits to the OCF 151 a CCR Event message. The event message contains an indicator that the account balance for the user should be read.

In step 505 the OCF transmits to the ABMS 103 an ABR Inquiry message (i.e. an ABR message with an Account-Balance-Action AVP field set to 5).

In step 507 the ABMS 103 on receipt of the ABR Inquiry message examines the indicated user's account to determine the balance of the account.

In step 509 the determined balance of the account is transmitted from the ABMS 103 to the OCF 151 in an ABA message.

In step 511 the determined balance is transmitted from the OCF 151 to the NE 51 in a CCA message.

Finally in step 513 the determined balance is transmitted from the NE to the UE 2 in a balance response message. The determined response can then be displayed on the UE for the user.

Figure 7:
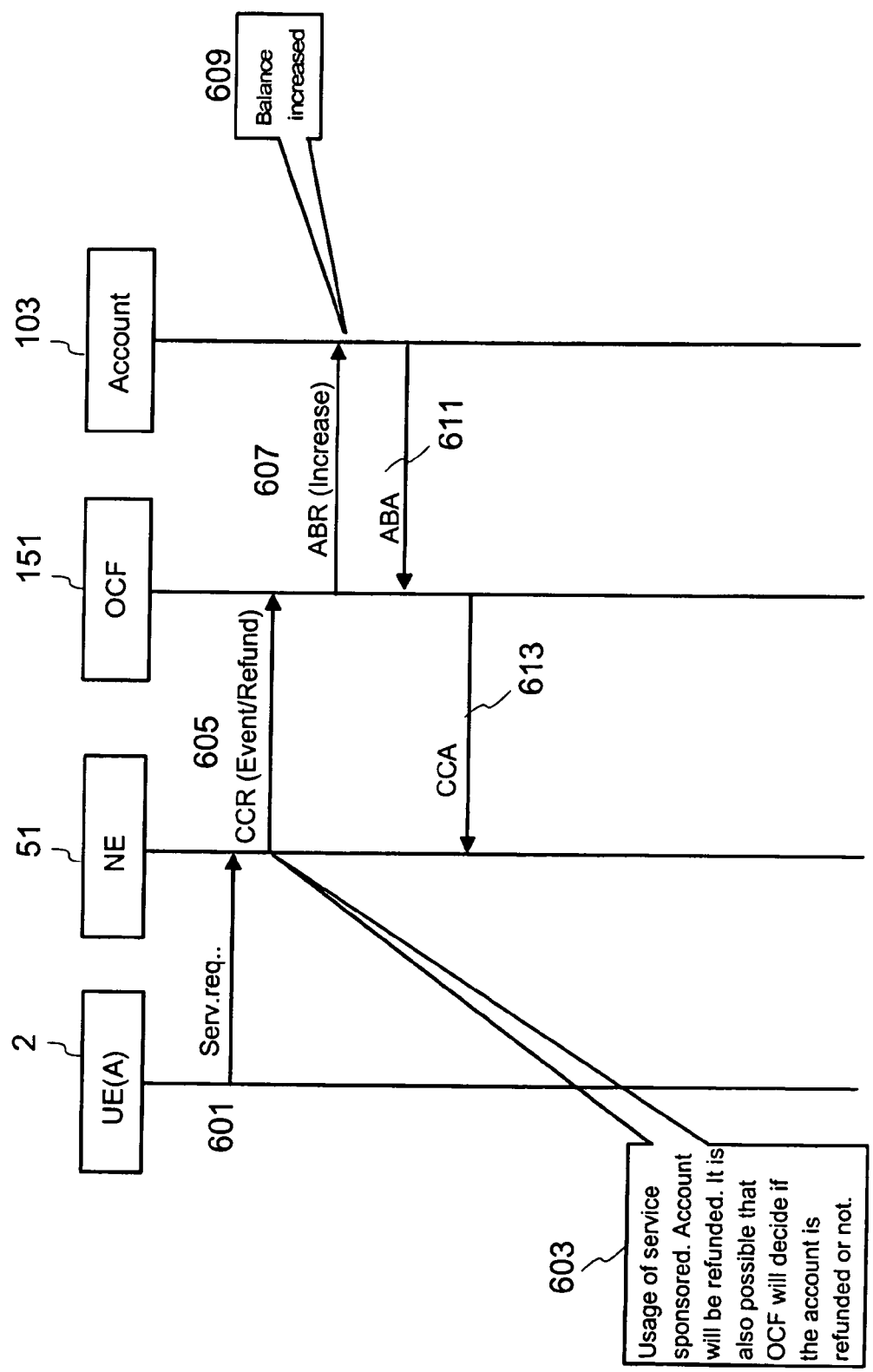

With respect to FIG. 7, a further example of the present invention is shown. In this example the usage of the service provided is at least partially subsidised by the operator or a third party and therefore a refund is payable into the users account. One example of which would be the situation where the operator sponsors a loyalty bonus scheme for example a "buy 10 minutes of video receive 1 euro of credit to your account" incentive scheme.

In step 601 the UE 2 requests a service by transmitting a service request message to the NE 51.

In step 603 the NE 51 determines that the requested service is entitled to a refund as the usage of the service is sponsored.

In step 605 the NE 51 then transmits to the OCF 151 a CCR Event/Refund message, in other words the CCR message contains an indication that a refund is to be paid into the user's account.

In step 607 the OCF 151 transmits to the ABMS 103 an ABR Increase message (i.e. an ABR message with an Account-Balance-Action AVP field set to 6). The message contains the details of the amount to be refunded to the user's account.

In step 609, once the ABMS 103 has received the ABR Increase message the ABMS 103 increases the balance of the user's account by the indicated credit value.

In step 611, once the ABMS 103 has successfully increased the user's account the ABMS then transmits to the OCF 151 an ABA message to confirm this action was successful.

In step 613, on receipt of the ABA message the OCF 151 transmits to the NE 51 a CCA message to confirm at the NE 51 that the action was successful.

In further embodiments of the present invention the OCF 151 on receipt of the CCR event/refund message can further check to determine if the user's account is to be refunded or not. The further embodiment step (not shown in FIG. 7) can be used as a secondary check against fraudulent attempts to receive account recharging.

Figure 8:
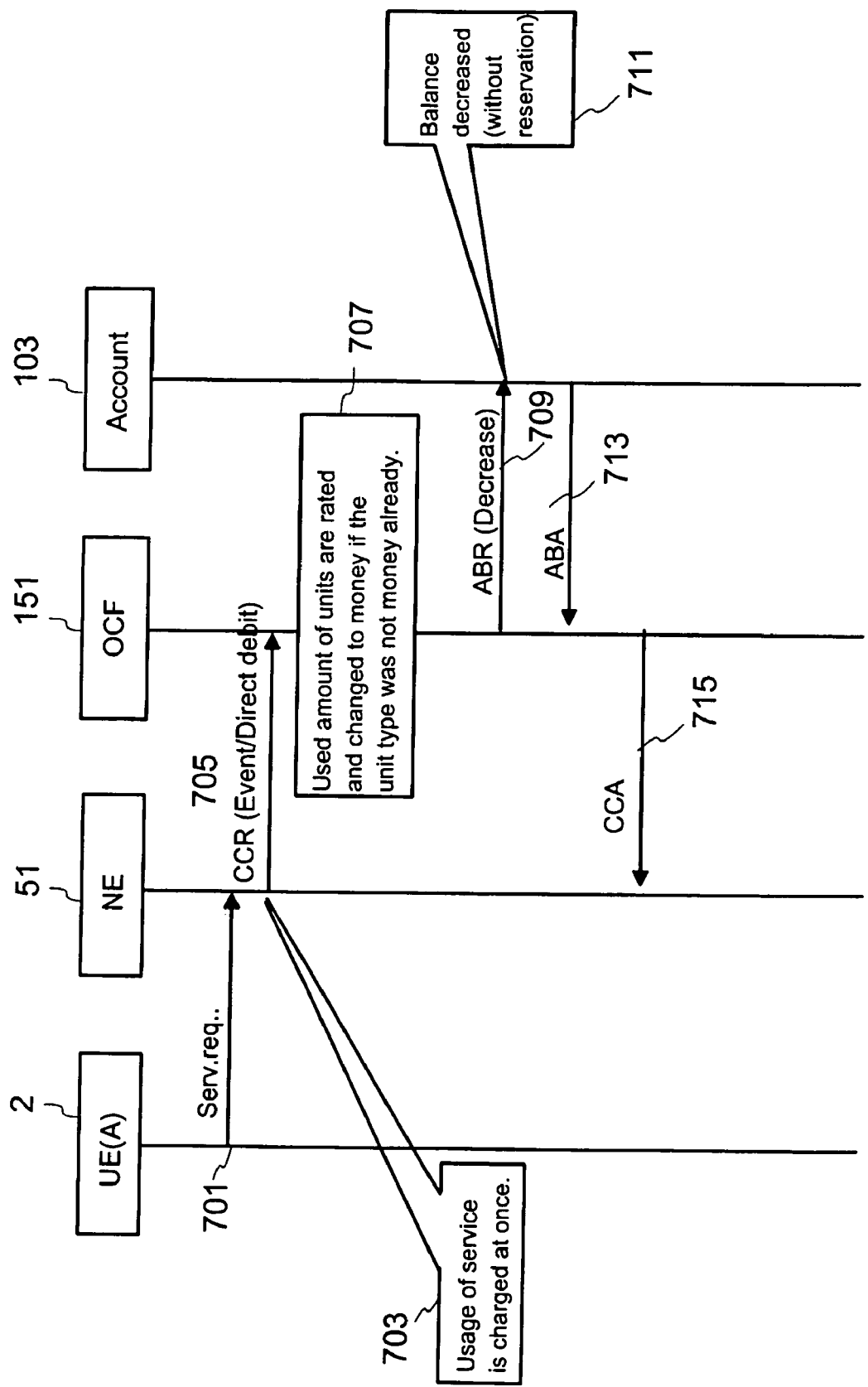

With respect to FIG. 8 a further example of an embodiment of the present invention is shown. The example shown in FIG. 8 is where the service requested by the user is a fixed fee service. One example of which could be a system whereby items such as transport tickets are purchased using the prepay facility on a mobile phone.

In step 701 the UE transmits to the NE 51 a service request.

In step 703 the NE on receipt of the request calculates the charge associated with the request.

In step 705 the NE 51 transmits to the OCF 151 a CCR Event/Direct Debit message. This message contains the calculated charge.

In step 707 the OCF 151 rates the amount of units used and where necessary if it has not been done previously changes the charged units into credits (which in the above examples have been monetary credits).

In step 709 the OCF 151 transmits to the ABMS 103 an ABR Decrease message (i.e. an ABR message with an Account-Balance-Action AVP field set to 7). The decrease message contains the rated credit value by which the user's account is to be decreased.

In step 711 the ABMS 103 decreases the user's account by the value within the ABR decrease message. This operation of decreasing the account differs from the steps described in the previous examples as there is no reservation made on the account.

In step 713 the ABMS then transmits an ABA message to the OCF 713 to confirm that the request was successfully carried out.

In step 715 the ABMS then transmits a CCA message to the NE 51 to confirm at the NE 51 that the request was successfully carried out.

Therefore it can be seen with reference by the examples described above that the account balance management server 103 can in combination with the charging and rating server (CRS) 101 carry out a wide range of on line charging management operations. Furthermore as the ABMS 103 and the CRS 101 have a well defined range of communications it is possible to incorporate an online charging account management system into part of a centralised account handing system capable of handling both on-line and off-line account requests and therefore overcoming the problem of duplication of accounts. Furthermore such a system allows an operator to employ a much greater flexibility of account operation, such as offering the user a single combined (online and offline) account which can have the advantage of being used by the user to produce an almost instant balance inquiry.

In further embodiments of the present invention the request and answer messages sent between the CRS 101 and the ABMS 103 (which for the previous examples described above are ABR and ABA messages) are instead based on existing Diameter base messages.

In other embodiments of the present invention the request and answer messages are diameter credit control request and diameter credit control answer messages respectively.

Various modifications to the described embodiments will be understood by one skilled in the art. The scope of protection afforded by the invention is defined by the appended claims.

The invention claimed is:

1. An apparatus, comprising at least one processor and at least one memory storing computer program code, wherein the at least one memory and stored computer program code are configured to, with the at least one processor, cause the apparatus to at least:
   receive an account request message transmitted from a network service provider; and
   cause transmission of an online account balance request message to an account balance management server based on the received account request message, the account balance management server being physically separated from the apparatus; and
   receive an incoming online account balance answer message sent by the account balance management server in response to the online account balance request message;
   wherein the apparatus comprises or is embodied on an online charging management server.

2. The apparatus as claimed in claim 1, wherein the online account balance answer message comprises a value based on the online account balance request message.

3. The apparatus as claimed in claim 1, wherein the online account balance answer message is configured to be a Diameter message.

4. The apparatus as claimed in claim 3, wherein the online account balance answer message is further configured to be a Diameter credit control message.

5. The apparatus as claimed in claim 1, wherein the apparatus is configured to be a rating server.

6. The apparatus as claimed in claim 1, wherein the online account balance request message comprises a field indicating an action requested of the account balance management server.

7. The apparatus as claimed in claim 6, wherein the field indicating an action requested of the account balance management server comprises a request configured to be at least one of:
   make a reservation;
   commit reservation and make new reservation;
   commit reservation;
   release reservation;
   balance query;
   increase balance; and
   decrease balance.

8. The apparatus as claimed in claim 1, wherein the online account balance request message comprises an identifier linking a user requesting a service to an account code stored by the account balance management server.

9. The apparatus as claimed in claim 1, wherein the account balance management server is configured to provide both online charging account management and offline charging account management functionality.

10. An apparatus, comprising at least one processor and at least one memory storing computer program code, wherein the at least one memory and stored computer program code are configured to, with the at least one processor, cause the apparatus to at least:
    receive an online account balance request message sent by an online charging management server, the online account balance request message based on an account request message transmitted to the online charging management server from a network service provider, the online charging management server being physically separated from the apparatus;
    perform an online account balance action based on the online account balance request message; and
    cause transmission of an outgoing online account balance answer message to the online charging management server;
    wherein the apparatus comprises or is embodied on an account balance management server.

11. The apparatus as claimed in claim 10, wherein the online account balance request message comprises a request configured to be at least one of:
    make a reservation;
    commit reservation and make new reservation;
    commit reservation;
    release reservation;
    balance query;
    increase balance; and
    decrease balance.

12. The apparatus as claimed in claim 10, wherein the online account balance answer message comprises a value determined based on the online account balance action.

13. The apparatus as claimed in claim 10, wherein the account balance management server is configured to provide both online charging account management and offline charging account management functionality.

14. The apparatus as claimed in claim 10, wherein the online account balance request message comprises a field indicating an action requested of the account balance management server, and wherein the at least one memory and stored computer program code are configured to, with the at least one processor, cause the apparatus to perform the online account balance action based at least in part upon the action requested of the account balance management server.

15. The apparatus as claimed in claim 10, wherein the online account balance request message comprises an identifier linking a user requesting a service to an account code, and wherein the at least one memory and stored computer program code are configured to, with the at least one processor, cause the apparatus to perform the online account balance action based at least in part upon the identifier.

16. A system comprising:
    an online charging management server; and
    an account balance management server, the account balance management server being physically separated from the online charging management server;
    wherein the online charging management server is configured to:

receive an account request message transmitted from a network service provider;

transmit an online account balance request message to the account balance management server based on the received account request; and receive an incoming online account balance answer message sent by the account balance management server in response to the online account balance request message; and wherein the account balance management server is configured to:

perform an online account balance action based on the online account balance request message; and transmit the online account balance answer message to the online charging management server.

17. A method, comprising:

receiving, at an online charging management server, an account request message transmitted from a network service provider;

causing transmission of an online account balance request message to an account balance management server based on the received account request message, the account balance management server being physically separated from the online charging management server; and receive an incoming online account balance answer message sent by the account balance management server in response to the online account balance request message.

18. The method as claimed in claim 17, wherein the online account balance request message comprises a field indicating an action requested of the account balance management server.

19. The method as claimed in claim 17, wherein the account balance management server is configured to provide both online charging account management and offline charging account management functionality.

20. A computer program product comprising at least one computer readable medium, the at least one computer readable medium storing program instructions configured to cause a processor to perform a method, the method comprising:

receiving at an online charging management server an account request message transmitted from a network service provider;

causing transmission of an online account balance request message to an account balance management server based on the received account request message, the account balance management server being physically separated from the online charging management server; and receiving an incoming online account balance answer message sent by the account balance management server in response to the online account balance request message.

21. The computer program product as claimed in claim 20, wherein the online account balance request message comprises a field indicating an action requested of the account balance management server.

22. The computer program product as claimed in claim 20, wherein the account balance management server is configured to provide both online charging account management and offline charging account management functionality.

23. A method comprising:

receiving, at an account balance management server, an online account balance request message sent by an online charging management server, the online account balance request message based on an account request message transmitted to the online charging management server from a network service provider, the online charging management server being physically separated from the account balance management server; and performing an online account balance action based on the received online account balance request message; and causing transmission of an outgoing online account balance answer message to the online charging management server.

* * * * *

UNITED STATES PATENT AND TRADEMARK OFFICE
CERTIFICATE OF CORRECTION

PATENT NO. : 7,764,947 B2
APPLICATION NO. : 11/293155
DATED : July 27, 2010
INVENTOR(S) : Koskinen et al.

Page 1 of 1

It is certified that error appears in the above-identified patent and that said Letters Patent is hereby corrected as shown below:

Column 13,

Line 11, after "configured to:" insert subparagraph --receive the online account balance request message;--.

Signed and Sealed this

Thirtieth Day of November, 2010

David J. Kappos
*Director of the United States Patent and Trademark Office*